United States Patent
Chokri

(10) Patent No.: US 10,481,011 B2
(45) Date of Patent: Nov. 19, 2019

(54) TEMPERATURE PROBE

(71) Applicant: AKWEL SA, Champfromier (FR)

(72) Inventor: Ben Hammouda Chokri, Carpentras (FR)

(73) Assignee: AKWEL SA, Champfromier (FR)

(*) Notice: Subject to any disclaimer, the term of this patent is extended or adjusted under 35 U.S.C. 154(b) by 435 days.

(21) Appl. No.: 15/099,350

(22) Filed: Apr. 14, 2016

(65) Prior Publication Data
US 2016/0305825 A1    Oct. 20, 2016

(30) Foreign Application Priority Data
Apr. 14, 2015    (FR) .................. 15 53224

(51) Int. Cl.
*G01K 1/12*    (2006.01)
*G01K 7/22*    (2006.01)
(Continued)

(52) U.S. Cl.
CPC .......... *G01K 1/12* (2013.01); *B29C 45/14639* (2013.01); *G01K 7/22* (2013.01); *B29L 2031/34* (2013.01)

(58) Field of Classification Search
CPC .. G01K 7/22; G01K 1/12; G01K 1/08; G01K 1/14; G01K 2205/00; B29L 2031/34; B29C 45/14639
See application file for complete search history.

(56) References Cited

U.S. PATENT DOCUMENTS

| | | | |
|---|---|---|---|
| 7,812,705 B1* | 10/2010 | Kozhukh ................. | G01K 1/08 338/220 |
| 2007/0127552 A1* | 6/2007 | Bronnert ................. | G01K 1/08 374/185 |

(Continued)

FOREIGN PATENT DOCUMENTS

| CN | 102322965 A | † | 1/2012 |
|---|---|---|---|
| DE | 102004062908 A1 | † | 7/2006 |

(Continued)

OTHER PUBLICATIONS

English translation of foreign patent document FR 2699673 A1 that is listed on the IDS filed Apr. 14, 2016.*

(Continued)

*Primary Examiner* — Justin Seo
*Assistant Examiner* — John M Royston
(74) *Attorney, Agent, or Firm* — Oliff PLC

(57) ABSTRACT

The invention concerns a temperature probe (1) comprising a thermistor provided with a heat-sensitive element connected to two electrically-conductive output wires, two electrically-conductive metal blades presenting proximal end portions connected, by welding, to the respective output wires and supporting said heat-sensitive element at a distance from said proximal end portions, and a plunger body (5) made in a plastic material overmolded by injection at least around the proximal end portions of the blades, of the output wires and of the heat-sensitive element, said plunger body presenting an end portion (50) overmolded directly all around the heat-sensitive element, said heat-sensitive element being wrapped only by said plunger body.

Figure 1E:
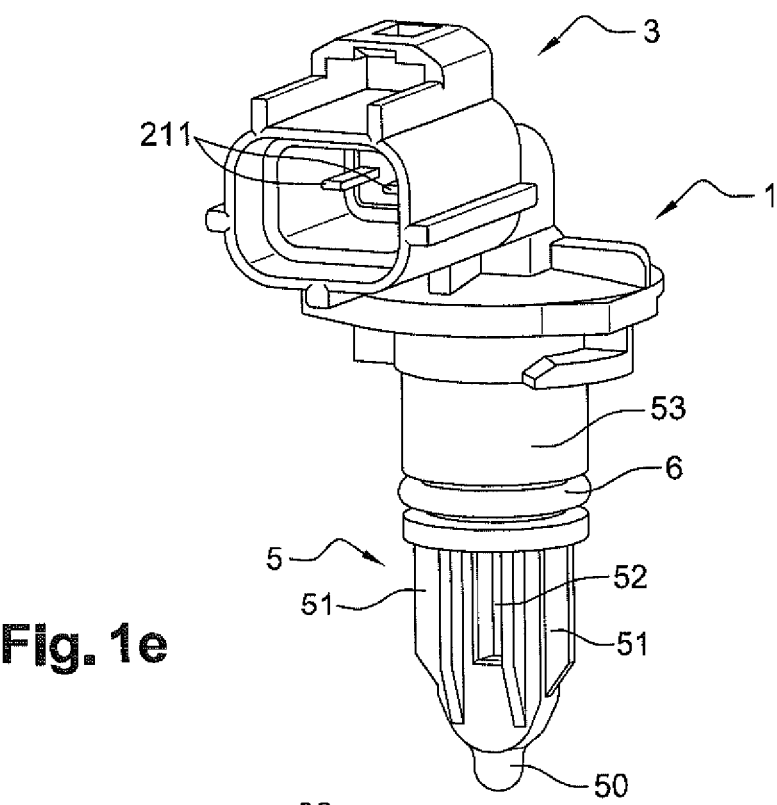

The present invention finds application in the field of temperature measurement of a fluid circulating within a combustion engine.

20 Claims, 3 Drawing Sheets

(51) Int. Cl.
*B29C 45/14* (2006.01)
*B29L 31/34* (2006.01)

(56) References Cited

U.S. PATENT DOCUMENTS

| | | | | |
|---|---|---|---|---|
| 2011/0019714 A1* | 1/2011 | Perry | ................ | B29C 45/14639 |
| | | | | 374/183 |
| 2015/0260586 A1* | 9/2015 | Inaba | ....................... | G01K 7/22 |
| | | | | 374/185 |
| 2015/0306333 A1* | 10/2015 | Amadio | ............ | A61M 16/0875 |
| | | | | 128/204.17 |

FOREIGN PATENT DOCUMENTS

| | | | | |
|---|---|---|---|---|
| EP | 0508891 | A1 | 10/1992 | |
| FR | 2582398 | A1 * | 11/1986 | ............... G01K 3/00 |
| FR | 2660431 | A1 | 10/1991 | |
| FR | 2699673 | A1 | 6/1994 | |
| FR | 2714462 | A1 | 6/1995 | |

OTHER PUBLICATIONS

Jan. 29, 2016 Search Report issued in French Patent Application No. 1553224.

\* cited by examiner
† cited by third party

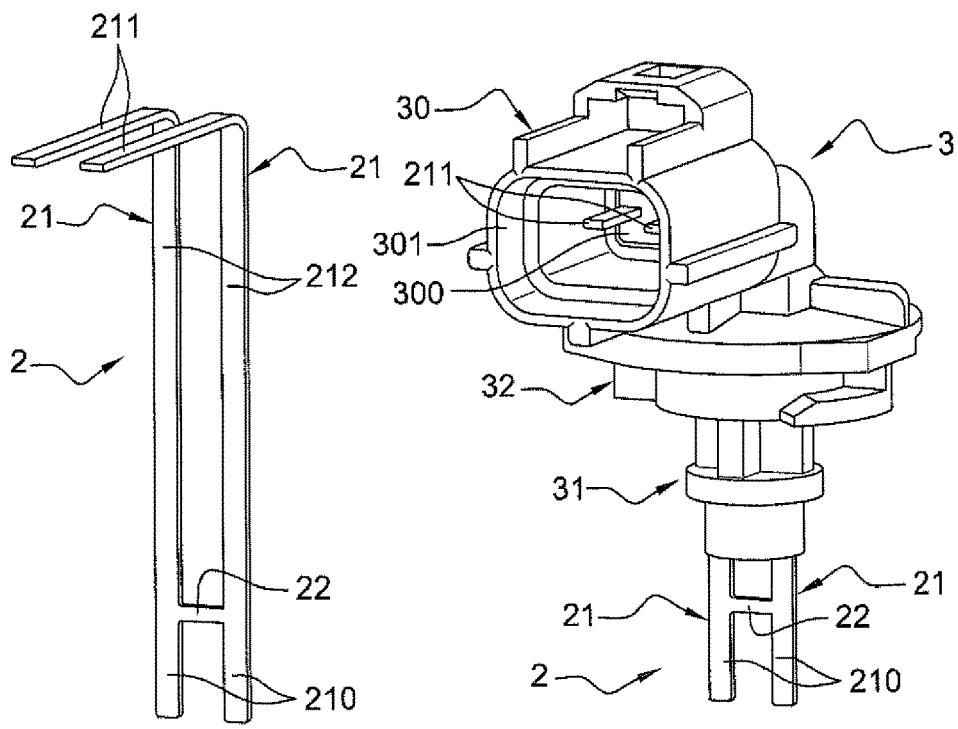
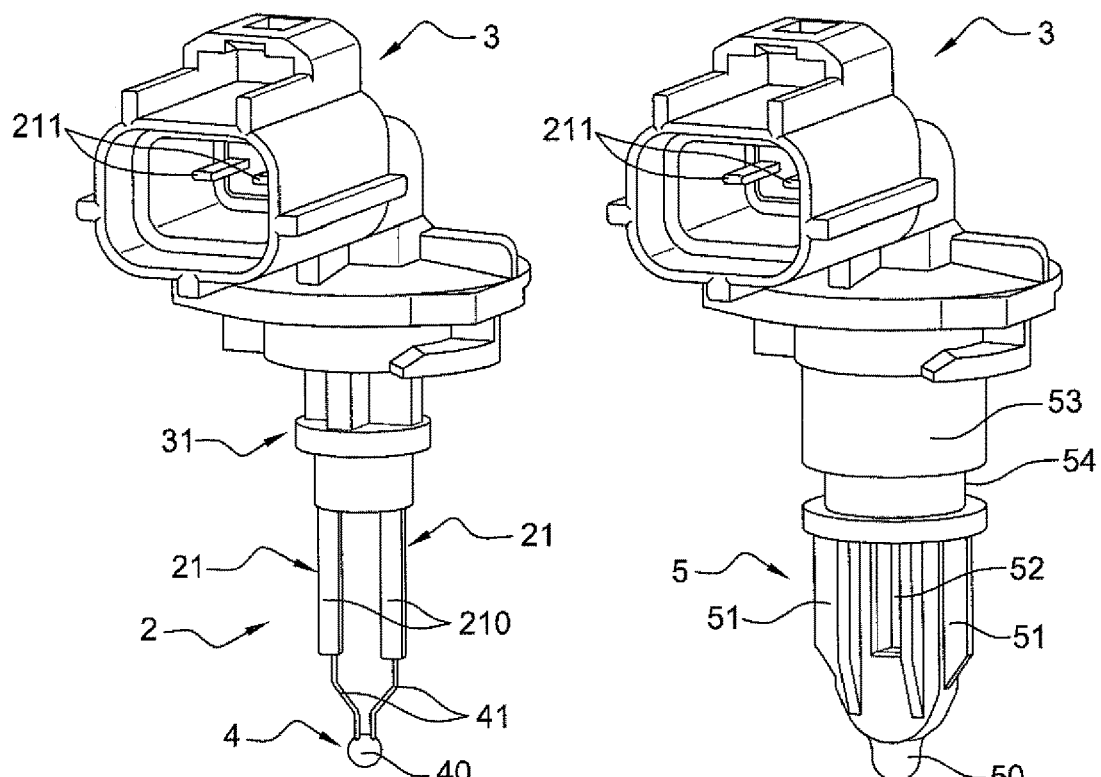

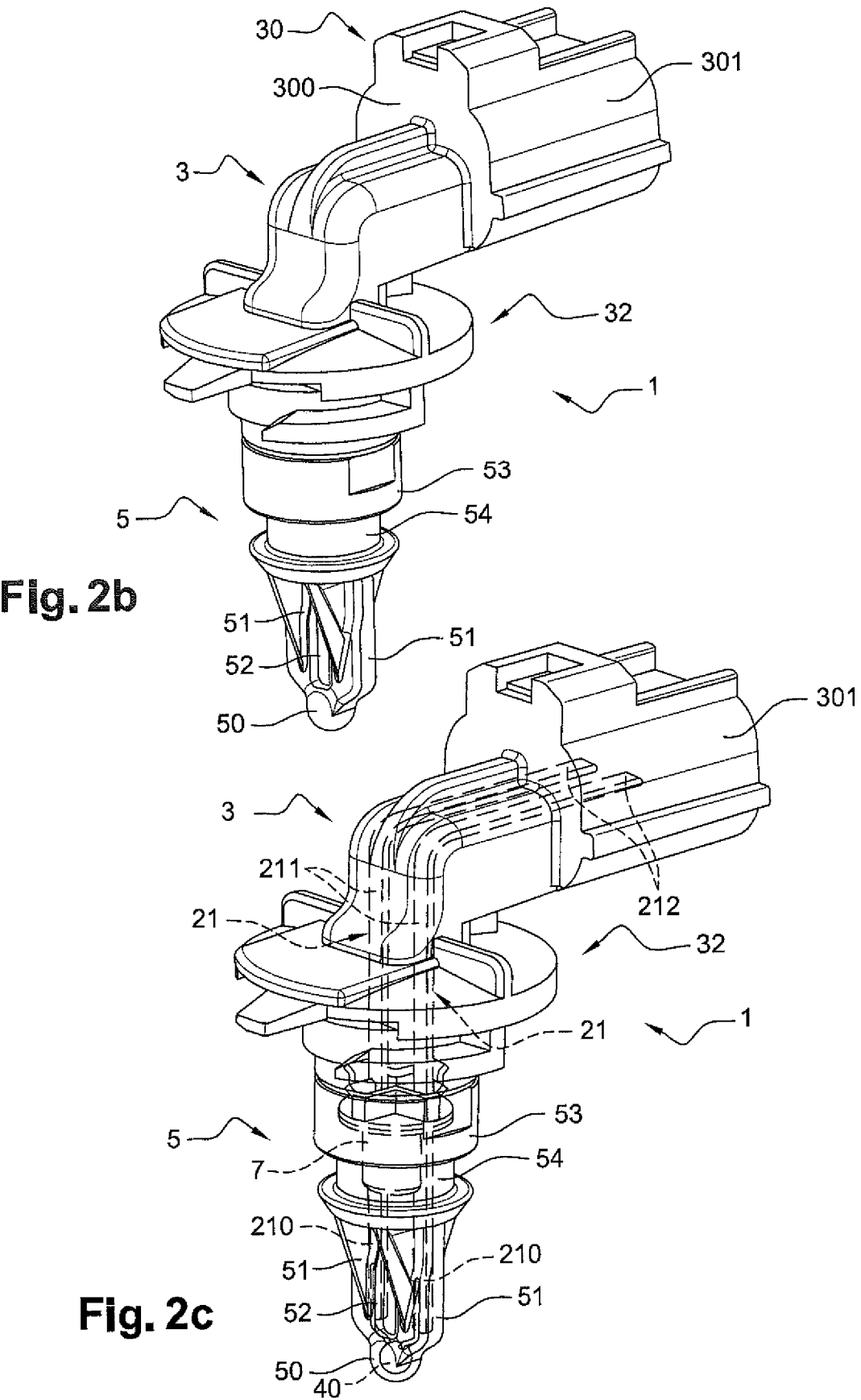

TEMPERATURE PROBE

The present invention relates to a temperature probe, as well as to a method for manufacturing such a temperature probe.

The invention finds a preferred, but not exclusive, application in the field of measuring the temperature of a fluid circulating within a combustion engine, in particular in a fuel supply circuit, a cooling circuit or an air intake circuit.

Conventionally, a temperature probe comprises a thermistor provided with a heat-sensitive element connected to two electrically-conductive output wires; this heat-sensitive element being a temperature-sensitive electrical resistance element, generally surrounded by a coating layer often made of epoxy or glass depending on the technology of the electrical resistance which is either of the NTC (Negative Temperature Coefficient) type or of the PTC (Positive Temperature Coefficient) type.

In order to protect the heat-sensitive element from the fluid aggressions, it is known not to put the heat-sensitive element in direct contact with the fluid, but to cover it with a protective sheath, sometimes called plunger; this sheath being filled with a coating thermal paste in order to immobilize the thermistor and fill up the spacing between the heat-sensitive element and the wall of the sheath.

However, the operation of laying or casting the thermal paste turns out to be tedious and expensive. Furthermore, with such a solution, the reduction of the response time is not optimum because of the extra thicknesses around and above the heat-sensitive element induced by the presence of thermal paste combined with the thickness of the sheath, and more precisely, response times between 10 and 11 seconds are generally observed, which are considered to be unsatisfactory by the Applicant.

The present invention aims to resolve all or part of the aforementioned drawbacks, and in particular to provide a temperature probe offering reduced response times, shorter than 10 seconds.

To this end, it provides a temperature probe comprising a thermistor provided with a heat-sensitive element connected to two electrically-conductive output wires, said probe being remarkable in that it comprises two electrically-conductive metal blades presenting proximal end portions connected by welding to the respective output wires and supporting the heat-sensitive element at a distance from the proximal end portions, and in that it further comprises a plunger body produced in a plastic material overmolded by injection at least around the proximal end portions of the blades, the output wires and the heat-sensitive element, this plunger body presenting an end portion overmolded directly all around the heat-sensitive element, said heat-sensitive element being wrapped only by said plunger body.

Thus, by maintaining the heat-sensitive element at a distance from the blades, this heat-sensitive element is released from any external element therearound, with the exception of the two sole output wires, and so the plunger body coats, by overmolding, this heat-sensitive element all around its perimeter (at its end, along its periphery and between the output wires which come out of the heat-sensitive element).

In the end, in the probe, only the overmolded plunger body protects the heat-sensitive element, without the use of any thermal paste or additional sheath. In other words, in the temperature probe according to the invention, there is no internal supporting element to support or to maintain the heat-sensitive element, wherein said internal supporting element would have been overmolded by the plunger body.

Furthermore, the weld connection between the output wires and the metal blades is provided for obtaining connections which resist, both in temperature and pressure, to the conditions of injection inside a mold for forming the plunger body.

Thanks to the invention, it is therefore easy to reduce the response time by optimizing the thickness of the end portion of the plunger body.

Advantageously, the end portion of the plunger body presents a maximum overmold thickness comprised between 0.2 and 1.5 millimeter, and in particular between 0.4 and 1.0 millimeter.

In other words, the overmold thickness around the heat-sensitive element will not exceed this maximum thickness, thereby offering a particularly reduced response time in comparison with the commonly observed response times, and in particular a response time shorter than 10 seconds, in particular in the range of 5 to 7 seconds.

According to one feature, the plunger body presents two wrapping portions prolonging the end portion and overmolded, at least partially, around the respective output wires, said plunger body presenting a through central slot extending between said wrapping portions.

In this manner, thanks to this conformation of the plunger body with a central slot, the fluid fills the central slot and therefore passes above the heat-sensitive element, thereby further enhancing the sensitivity of measurement of the fluid temperature by the heat-sensitive element and therefore reducing again the response time.

According to another feature, the two blades present distal end portions provided for being connected to a measuring apparatus and intermediate portions extending between the proximal and distal end portions, and the probe further comprises a connecting body produced in a plastic material overmolded by injection at least partially around the intermediate portions of the blades, wherein the distal end portions are not being overmolded by said connecting body and left free in order to enable connection with the measuring apparatus.

Thus, a second body, namely the connecting body, ensures the protection of the probe in the upper part, also with the function of ensuring the fastening on a support and the wiring of the measuring apparatus on the distal end portions of the blades. Furthermore, this connecting body allows maintaining the two blades in place before the overmolding by the plunger body.

In a first embodiment, the plunger body and the connecting body consist of two distinct bodies produced by bi-injection, and the plunger body presents a cover portion which overmolds in part the connecting body, the overmolding of said plunger body being produced subsequently to the overmolding of said connecting body.

Thus, the connecting body is produced firstly, then the plunger body is produced secondly, advantageously according to a method of bi-injection of two plastic materials within an injection mold.

Advantageously, the cover portion is located at least in part above at least one seal groove formed on the plunger body, the seal groove being provided for receiving an O-ring seal.

In this manner, the cover portion between the two bodies is produced so as to avoid any leakage problem; the O-ring being located upstream of the cover portion so as to avoid any risk of penetration of the circulating fluid, at the junction between the two injected materials. Due to functional constraints, it may be sometimes justified to consider using two joints, therefore two seal grooves, in order to guarantee the sealing and the durability of the connection of the probe with its receptacle.

In a particular embodiment, the plastic material of the plunger body is different from the plastic material of the connecting body.

Indeed, the requirements are not the same for the two bodies, the plunger body and the connecting body, because the plunger body has mainly the function of protecting the heat-sensitive element while offering a high thermal conductivity for an optimum measurement, whereas the connecting body has mainly the function of ensuring the anchoring of the probe on a support.

According to one possibility of the invention, the plastic material of the plunger body presents a thermal conductivity higher than that of the plastic material of the connecting body.

In a second embodiment, the plunger body and the connecting body are produced into one single piece in the same plastic material by single-injection.

Thus, the connecting body and the plunger body are produced together according to a single-injection method in the same plastic material within an injection mold.

According to another possibility of the invention, the output wires of the thermistor are connected by electric or ultrasonic welding directly on the blades.

The electric or ultrasonic welding is particularly advantageous for resisting the temperature and pressure conditions during an injection of a plastic material(s) inside a mold.

The invention also relates to a method for manufacturing a temperature probe in accordance with the invention, comprising the following steps of:
    providing a thermistor comprising a heat-sensitive element connected to two electrically-conductive output wires;
    providing two electrically-conductive metal blades presenting proximal end portions;
    connecting, by welding, the output wires of the thermistor to the proximal end portions of the respective blades;
    producing a plunger body by the injection in a mold, with a first plastic material, for an overmolding at least around the proximal end portions of the blades, the output wires and the heat-sensitive element, so that said plunger body presents an end portion overmolded directly all around the heat-sensitive element, and so that said heat-sensitive element is wrapped only by said plunger body.

Thus, in situation, the heat-sensitive element is nowhere in contact with the conveyed fluid whose probe measures the temperature.

In a first embodiment with bi-injection, the two blades are initially brought together by a transverse connecting element, and the method comprises the following steps of:
    connecting by welding the output wires of the thermistor to the proximal end portions of the respective blades which extend under the transverse element, said transverse element linking the two blades during this connection of the output wires;
    before producing, by overmolding, the plunger body, producing a connecting body by the injection in the mold, with a plastic material, for an overmolding around the portions of the blades which extend above the transverse element, said blades presenting distal end portions which are not overmolded by said connecting body and left free in order to enable the connection with a measuring apparatus, the transverse element not being overmolded and linking the two blades during this overmolding by the connecting body;
    producing the plunger body by the partial overmolding of the connecting body, the portions of the blades which are not overmolded by the connecting body, the output wires and the thermistor.

Thus, the transverse element will allow maintaining the two blades away from each other during the connection of the output wires then during the production of the connecting body.

According to one possibility, prior to the plunger body production step and subsequently to the connecting body production step, the method comprises a step of removing the transverse element between the two blades.

If this transverse element is made of an electrically-conductive material, and more specifically if this transverse element consists of a metallic element provided integrally with the two blades so as to form one single metallic piece, then this transverse element will be removed (in order to avoid a short-circuit when in use) before producing the plunger body, because the connecting body had taken over to maintain the two blades spaced apart from each other.

In a second embodiment, the two blades are initially brought together by means of a support part made of an electrically-insulating material, said support part maintaining the two blades in place and spaced apart from each other inside the mold.

Thus, this support part forms a connecting part affixed between the two blades and made of an electrically-insulating material.

In the case of a bi-injection, it is possible to consider using, in particular for this support part, a material which melts, entirely or partially, during the injection. Thus, in the case of a bi-injection, during the plunger body molding step, all or part of the support part starts melting.

In the case of a single-injection, it is necessary that this support part ensures a permanent maintenance during the injection and therefore, it will be considered using, for this support part, a material which is resistant enough to withstand the conditions of injection in the mold, and the support part may be left in place.

Thus, in the case of a single-injection, the method comprises the following steps of:
    connecting by welding the output wires of the thermistor to the proximal end portions of the respective blades which extend under the support part;
    producing by overmolding the plunger body and a connecting body according to a method of single-injection of a plastic material inside an injection mold, said connecting body being overmolded around the support part and the portions of the blades which extend above the output wires, said blades presenting distal end portions which are not overmolded by said connecting body and left free in order to enable the connection with a measuring apparatus, so that the plunger body and the connecting body are produced into one single piece in the same plastic material.

Figure 2A:
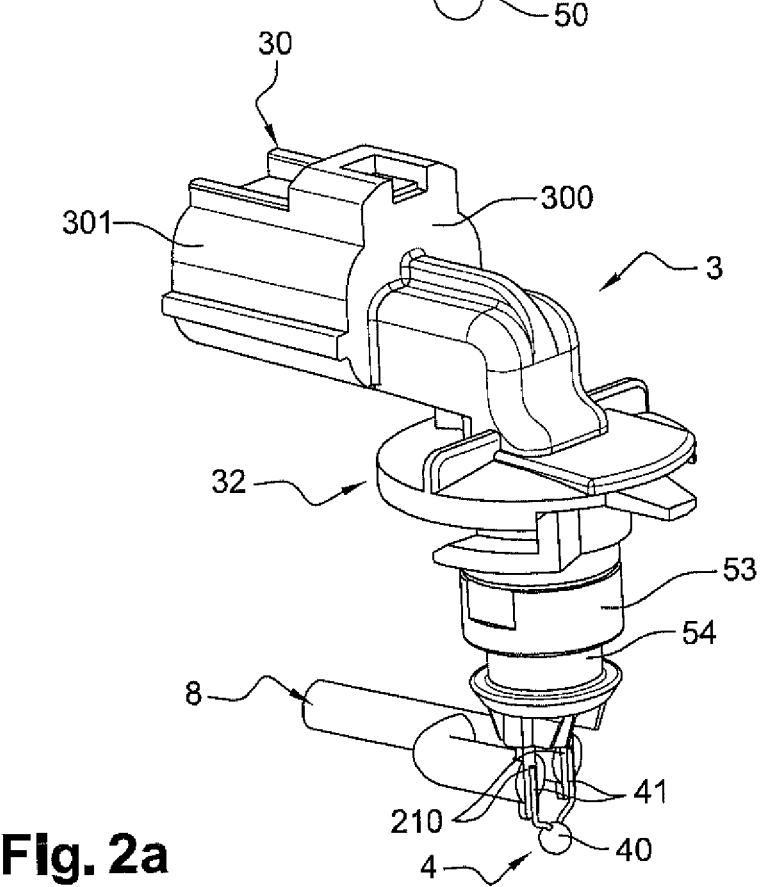

Other features and advantages of the present invention will appear upon reading the detailed description hereinafter, of two non-limiting examples of implementation, with reference to the appended drawings in which:

FIGS. 1a to 1e are schematic perspective views of the temperature probe at different steps of its manufacturing according to a first manufacturing method; and FIGS. 2a to 2c are schematic perspective views of the temperature probe at different steps of its manufacturing according to a second manufacturing method.

Referring to FIGS. 1a to 1e, according to a first method for manufacturing a probe 1 in accordance with the invention implementing an overmolding according to a bi-injection method, the following steps are described hereinafter; the final probe 1 being visible in FIG. 1e.

In a first step which is visible in FIG. 1a, there is provided a conductive part 2 made of an electrically-conductive material, and in particular of metal, produced into one single piece and presenting two blades 21 transversely linked to each other by means of a transverse element 22 forming a bridge between the two blades 21. Thus, the conductive part 2 is generally <<H>>-shaped.

Each blade 21 presents a proximal end portion 210 and a distal end portion 211 opposite to each other, as well as an intermediate portion 212 extending between the proximal 210 and distal 211 end portions. Optionally, each blade 21 presents a 90° curvature, so that the distal end portions 211 are inclined at 90° with respect to the proximal end portions 210.

The transverse element 22 is located on the intermediate portions 212 of the blades 21, closer to the proximal end portions 210 than to the distal end portions 211.

The transverse element 22 allows maintaining the two blades 21 parallel and at a distance from each other.

In a second step which is visible in FIG. 1b, the conductive part is placed in an injection mold (not illustrated), and a connecting body 3 is produced by overmolding, in a plastic material called second plastic material, around the portions of the blades 21 which extend above the transverse element 22, in other words around the portions of the intermediate portions 212 of the blades 21 which are located between the transverse element 22 and the distal end portions 211. This first overmolding is carried out in the injection mold.

During this second step, the distal end portions 211 are not overmolded by the connecting body 3 and are left free in order to enable the connection with a measuring apparatus (not illustrated).

The connecting body 3 presents an upper interface 30 provided with a bottom 300 from which the distal end portions 211 protrude and with a peripheral wall 301 surrounding these distal end portions 211. Thus, these exposed upper interface 30 and the distal end portions 211 form a male connector plug adapted to cooperate with a female connector plug having a complementary shape, for a connection with an external measuring apparatus.

The connecting body 3 presents a lower sleeve 31 which partially wraps the intermediate portions 212 of the blades 21, above the transverse element 22. During this second step, the transverse element 22 is also not overmolded by the connecting body 3 and remains exposed and in place to connect the two blades 21 during this overmolding by the connecting body 3.

The connecting body 3 presents an anchoring portion 32, located between the upper interface 30 and the lower sleeve 31, and which serves in fastening or anchoring the probe 1 on a support (not illustrated). To this end, this anchoring portion 32 presents fastening elements, in particular by snap-fitting or by screwing, provided for cooperating with complementary fastening elements carried by the support.

In a third step which is visible in FIG. 1c, the transverse element 22 is removed, in particular by sectioning, sawing or cutting it, and the two output wires 41 of a thermistor 4 are connected on the respective proximal end portions 210 of the blades 21.

The thermistor 4 is provided with a heat-sensitive element 40 connected to two electrically-conductive output wires 41. This heat-sensitive element 40 is a temperature-sensitive electrical resistance element, of the NTC (Negative Temperature Coefficient) type or of the PTC (Positive Temperature Coefficient) type, and this electrical resistance is surrounded by a coating layer, for example made of epoxy or glass.

The output wires 41 of the thermistor 4 are connected by electric or ultrasonic welding directly on the blades 21, by means of two electric or ultrasonic welding points, with one welding point for each output wire 41.

Thus, the blades 21 support the output wires 41 and therefore the heat-sensitive element 40 which is then carried in a cantilever fashion at a distance from the proximal end portions 210.

In a fourth step which is visible in FIG. 1d, a plunger body 5 is produced by the overmolding, in a plastic material called first plastic material, around the proximal end portions 21 of the blades 2, of the output wires 41 and of the heat-sensitive element 40. Upon completion of this fourth step, the blades 21 are completely overmolded by the plunger body 5 and by the connecting body 3, with the exception of the distal end portions 211 of the blades 21 which remain exposed for an electrical connection with the external measuring apparatus. Advantageously, this second overmolding is carried out in the same injection mold as that used in the first overmolding with the connecting body 3.

plunger body 5 presents an end portion 50 overmolded directly all around the heat-sensitive element 40, which wraps the heat-sensitive element 40 on the bottom, on its perimeter or periphery and on the top. Only the plunger body 5 wraps the heat-sensitive element 40. This end portion 50 presents a maximum overmold thickness comprised between 0.2 and 1.5 millimeter, and preferably between 0.4 and 1.0 millimeter. As example, this end portion 50 presents a maximum thickness between 0.5 and 0.8 millimeter. This end portion 50 presents a substantially hemispherical general shape, in order to conform, to the closest, to the heat-sensitive element 40.

The plunger body 5 also presents two wrapping portions 51 elongating the end portion 50 and overmolded, at least partially, around the two respective output wires 41; a through central slot 52 extending between these two wrapping portions 51, above the end portion 50.

The plunger body 5 also presents a cover portion 53 in the form of a sleeve, which is overmolds, in part, the connecting body 3, and more specifically, which overmolds the lower sleeve 31 of the connecting body 3. This cover portion 53 is located above a peripheral groove 54, called seal groove.

In a fifth step which is visible in FIG. 1e, an O-ring 6 is disposed inside the peripheral groove 54.

The following description concerns a variant of the first method described hereinabove, also implementing an overmolding according to a bi-injection method; the order of the steps being the only difference.

The first step is identical to the first step of the first method described with reference to FIG. 1a, and consists therefore in providing the already described conductive part 2.

In a second step, the two output wires 41 of the thermistor 4 are connected on the respective proximal end portions 210 of the blades 21. This connection step has been described hereinabove, recalling that the output wires 41 of the thermistor 4 are connected by electric or ultrasonic welding directly on the blades 21. Thus, the blades 21 support the output wires 41 and therefore the heat-sensitive element 40 which is then carried in a cantilever fashion at a distance from the proximal end portions 210.

The third step is identical to the second step of the first method described with reference to FIG. 1b, and consists therefore in producing, by overmolding, the already described connecting body 3.

In a fourth step, the transverse element 22 is removed, as already described hereinabove.

The fifth step is identical to the fourth step of the first method described with reference to FIG. 1d, and consists therefore in producing, by overmolding, the already described plunger body 5.

The sixth step is identical to the fifth step of the first method described with reference to FIG. 1e, and consists therefore in disposing the O-ring 6.

The probe 1 obtained with the first method is identical to the probe obtained with its variant.

Referring to FIGS. 2a to 2c, according to a second method for manufacturing a probe 1 in accordance with the invention implementing an overmolding according to a single-injection method, the following steps are described hereinafter; the final probe 1 being visible in FIGS. 2b and 2c. FIG. 2a illustrates the probe during the injection (the mold being not visible), and FIGS. 2b and 2c illustrate the probe at the end of injection. In FIG. 2c, the overmolding is represented by transparency in order to visualize the inside of the probe, and in particular the thermistor 4 and the blades 21.

The second method essentially differs from the first method by the fact that the plunger body 5 and the connecting body 3 are produced into one single piece in the same plastic material according to a single-injection method in a mold. The same reference numerals will be used to describe this second method and the constitutive elements of the probe 1 obtained by this second method.

In a first step, there are provided two blades 21 made of an electrically-conductive material, and in particular of metal. These blades 21 are identical to those described hereinabove for the first method. Herein, the blades 21 are not linked to each other by means of a metallic transverse element 22.

In a second step, the two output wires 41 of a thermistor 4 are connected on the respective proximal end portions 210 of the blades 21. This step is identical to that described hereinabove for the first method, recalling that the output wires 41 of the thermistor 4 are connected by electric or ultrasonic welding directly on the blades 21.

In an third optional step, the two blades 21 are mounted on a support part 7 (visible by transparency in FIG. 2c) made of an electrically-insulating material, in particular of a plastic material. As such, the support part 7 may present two slots for receiving the blades 21. The object of this support part 7 is to maintain the two blades 21 spaced apart from each other and in place inside the injection mold. Preferably, the support part 7 is placed on the intermediate portions 212 of the blades 21, above the welding points. The second and third steps may be reversed.

In a fourth step, the two blades 21, supported by the support part 7 and welded to the output wires 41 of the thermistor 4, are placed inside an injection mold.

In a fifth step, retractable pins 8 (visible in FIG. 2a) are placed, which hold the proximal end portions 210 of the blades 21 in order to protect them during the injection overmolding in the mold, and in particular in order to avoid failure of the welding points.

Optionally, these pins 8 may also serve in maintaining the thermistor 4 and/or its output wires 41. The pins 8 contribute in maintaining the whole set in place so as to keep control over the thickness of the plastic material covering the thermistor 4, the output wires 41 and the blades 21, which should not be too large in order not to compromise the response time of the probe, nor too small in order to guarantee its robustness over time.

These pins 8 are retractable to the extent that they are movable between a deployed position in which the pins 8 hold the proximal end portions 210 of the blades 21, and a retracted position in which the pins 8 are away from the blades 21 in order to leave room for the plastic material which overmolds the blades 21.

In a sixth step, a plunger body 5 and the connecting body 3 are produced, by overmolding, in a plastic material, of the intermediate portions 212 of the blades 21, the proximal end portions 210 of the blades 21, the output wires 41 and the heat-sensitive element 40. The plunger body 5 and the connecting body 3 are identical to those of the probe 1 obtained according to the first method, and already described, with the difference that this time, the plunger body 5 and the connecting body 3 are produced into one single piece in the same plastic material, and advantageously in one single injection sequence.

During this sixth step, the pins 8 are retracted at some point carefully selected so that the plastic material does not freeze around the pins 8, the injection of the plastic material preferably starting at the level of the connecting body 3 and finishing at the level of the end portion 50 of the plunger body 5.

The probe 1 obtained according to the first method or according to the second method presents several advantages.

No thermal paste is used for protecting the heat-sensitive element 40, the plunger body 5 alone fulfilling this protection function, with a reduced thickness which guarantees a reduced response time, shorter than 10 seconds.

An electric or ultrasonic welding is particularly advantageous since it allows for welding points that resist the temperatures and pressures of plastic material injection during the production, by overmolding, of the plunger body 5.

Moreover, it is advantageous to use a heat-sensitive element whose electrical resistance is surrounded by a coating layer made of glass, rather than of epoxy. Indeed, glass presents a higher temperature resistance than epoxy, which is advantageous for resisting the temperatures of plastic material injection. The other materials of the thermistor will also be selected so as to resist the injection temperatures and pressures. As example, for the inner welds to the thermistor, it may be advantageous to use lead welds whose melting point is at 327.5° C.

In the particular case of the first method, thanks to the transverse element 22, the two blades 21 are held in place in the mold, during the production of the connecting body 3 by overmolding with the second plastic material, then this transverse element 22 is broken directly in the mold before producing the plunger body 5 by overmolding with the first plastic material.

It is preferable that the plastic material used for the plunger body 3 presents a good thermal conductivity, typically higher than or equal to 1 W/m·° K, and in particular comprised between 1 and 3 W/m·° K, in order to offer a reduced response time.

In the particular case of the first method, it may be considered, on the contrary, that the second plastic material presents a low thermal conductivity, typically lower than 1 W/·° K.

It is also important that the first and second plastic materials present a low electrical conductivity, and even consist of electrically-insulating materials, in order to avoid short-circuiting the two blades 21, for example, by having a volume resistivity higher than $10^6$ ohm·cm. Indeed, during the overmolding steps, the first and second plastic materials will be inserted into the spacing between the blades 21 and fill them up.

As regards the plastic materials that are used, these may be of the thermoplastic type, such as for example a polyamide or a polybutylene terephthalate material, or of the elastomeric or silicone type. These plastic materials may be filled or not with thermally-conductive fillers, in particular made of glass or ceramic.

Moreover, it is possible to consider providing for a post-overmolding treatment applied over the surface of the plunger body 5, such as for example a NiCu or ceramic coating, in order to increase the thermal conductivity and therefore reduce the response time of the probe 1.

Thanks to the invention, the number of components of the probe 1 is reduced to three, with an electrically-conductive set formed by the two blades 21, a thermistor 4 and a protective set formed by the two bodies 3, 5 overmolded in two steps in the same mold. Furthermore, the manufacturing method eliminates a step of depositing a thermal paste sometimes used in order to fill a thimble in which the thermistor is housed so as reduce the response time of the probe, thus reducing the duration and the complexity of the manufacturing method and the risks of pollution.

The invention claimed is:

1. A temperature probe comprising a thermistor provided with a heat-sensitive element connected to two electrically-conductive output wires, said temperature probe configured to be immersed into a fluid and measure a temperature thereof, wherein said temperature probe comprises two electrically-conductive metal blades presenting proximal end portions connected by welding to the respective electrically-conductive output wires and supporting said heat-sensitive element at a distance from said proximal end portions, and wherein said temperature probe further comprises a plunger body made of a plastic material overmolded by injection at least around the proximal end portions of the electrically-conductive metal blades, the electrically-conductive output wires and the heat-sensitive element, said plunger body presenting an end portion overmolded directly all around the heat-sensitive element, said heat-sensitive element being wrapped only by said plunger body, said plunger body configured to plunge into the fluid, wherein the electrically-conductive metal blades support the electrically-conductive output wires and the heat-sensitive element is carried in a cantilever fashion at a distance from the proximal end portions of the electrically-conductive metal blades, such that the heat-sensitive element is maintained at a distance from the electrically-conductive metal blades and the heat-sensitive element is released from any external element therearound, with the exception of the electrically-conductive output wires which come out of the heat-sensitive element and the plunger body which is overmolded around the heat-sensitive element.

2. The temperature probe according to claim 1, wherein the end portion of the plunger body presents a maximum overmold thickness comprised between 0.2 and 1.5 millimeter.

3. The temperature probe according to claim 1, wherein the end portion of the plunger body presents a maximum overmold thickness comprised between 0.4 and 1.0 millimeter.

4. The temperature probe according to claim 1, wherein the plastic material of the plunger body presents a thermal conductivity higher than or equal to 1 W/m·° K.

5. The temperature probe according to claim 4, wherein the plastic material of the plunger body presents a thermal conductivity between 1 and 3 W/m·° K.

6. The temperature probe according to claim 1, wherein the plunger body presents two wrapping portions elongating the end portion and overmolded, at least partially, around the respective electrically-conductive output wires, said plunger body presenting a through central slot extending between said wrapping portions.

7. The temperature probe according claim 1, wherein the two electrically-conductive metal blades present distal end portions provided for being connected to a measuring apparatus and intermediate portions extending between the proximal and distal end portions, and the temperature probe further comprises a connecting body made of a plastic material overmolded by injection at least partially around the intermediate portions of the electrically-conductive metal blades, wherein the distal end portions are not overmolded by said connecting body and left free in order to enable the connection with the measuring apparatus.

8. The temperature probe according to claim 7, wherein the plunger body and the connecting body consist of two distinct bodies produced by bi-injection, and the plunger body presents a cover portion which overmolds in part the connecting body, the overmolding by said plunger body being produced after the overmolding by said connecting body.

9. The temperature probe according to claim 8, wherein the cover portion is located at least in part above at least one seal groove formed on the plunger body, the seal groove being provided for receiving an O-ring seal.

10. The temperature probe according to claim 8, wherein the plastic material of the plunger body is different from the plastic material of the connecting body.

11. The temperature probe according to claim 10, wherein the plastic material of the plunger body presents a thermal conductivity higher than that of the plastic material of the connecting body.

12. The temperature probe according to claim 7, wherein the plunger body and the connecting body are produced into one single piece in the same plastic material by single-injection.

13. The temperature probe according to claim 1, wherein the output wires of the thermistor are connected by electric or ultrasonic welding directly on the electrically-conductive metal blades.

14. A method for manufacturing a temperature probe, said temperature probe configured to be immersed into a fluid and measure a temperature thereof, the method comprising the following steps of:

providing a thermistor comprising a heat-sensitive element connected to two electrically-conductive output wires;

providing two electrically-conductive metal blades presenting proximal end portions;

connecting by welding the electrically-conductive output wires of the thermistor to the proximal end portions of the respective electrically-conductive metal blades, such that the electrically-conductive metal blades support the electrically-conductive output wires and the heat-sensitive element is carried in a cantilever fashion at a distance from the proximal end portions of the electrically-conductive metal blades;

producing a plunger body by injection in a mold, with a plastic material, for an overmolding at least around the proximal end portions of the electrically-conductive metal blades, the electrically-conductive metal output wires and the heat-sensitive element, so that said plunger body presents an end portion overmolded directly all around the heat-sensitive element, and said heat-sensitive element is wrapped only by said plunger body, said plunger body configured to plunge into the fluid such that the heat-sensitive element is released from any external element therearound, with the exception of the electrically-conductive output wires which come out of the heat-sensitive element and the plunger body which is overmolded around the heat-sensitive element.

15. The method according to claim 14, wherein the two electrically-conductive metal blades are initially brought together by a transverse connecting element, and the method comprises the following steps of:
  connecting by welding the electrically-conductive metal output wires of the thermistor to the proximal end portions of the respective electrically-conductive metal blades which extend under the transverse element, said transverse element linking the two electrically-conductive metal blades during this connection of the electrically-conductive metal output wires;
  before producing by overmolding the plunger body, producing a connecting body by injection in the mold, with a plastic material, for an overmolding around the portions of the electrically-conductive metal blades which extend above the transverse element, said electrically-conductive metal blades presenting distal end portions which are not overmolded by said connecting body and left free in order to enable the connection with a measuring apparatus, the transverse element not being overmolded and linking the two blades during this overmolding by the connecting body;
  producing the plunger body by the partial overmolding of the connecting body, of the portions of the electrically-conductive metal blades which are not overmolded by the connecting body, of the electrically-conductive metal output wires and of the thermistor.

16. The method according to claim 15, wherein, prior to the plunger body production step and subsequently to the connecting body production step, the method comprises a step of removing the transverse element between the two electrically-conductive metal blades.

17. The method according to claim 14, wherein the two electrically-conductive metal blades are initially supported by a support part made of an electrically-insulating material, said support part maintaining the two electrically-conductive metal blades spaced apart from each other and in place inside the mold.

18. The method according to claim 17, wherein, during the plunger body molding step, all or part of the support part starts melting.

19. The method according to claim 17, wherein the method comprises the following steps of:
  connecting by welding the electrically-conductive metal output wires of the thermistor to the proximal end portions of the respective electrically-conductive metal blades which extend under the support part;
  producing by overmolding the plunger body and a connecting body according to a method of single-injection of a plastic material inside an injection mold, said connecting body being overmolded around the support part and the portions of the electrically-conductive metal blades which extend above the electrically-conductive metal output wires, said electrically-conductive metal blades presenting distal end portions which are not overmolded by said connecting body and left free in order to enable the connection with a measuring apparatus, so that the plunger body and the connecting body are produced into one single piece in the same plastic material.

20. The temperature probe according to claim 1, wherein only the plunger body coats the heat-sensitive element, without the use an internal supporting element overmolded by the plunger body and configured to support or to maintain the heat-sensitive element.

* * * * *